United States Patent
Stiller et al.

(10) Patent No.: US 6,871,731 B2
(45) Date of Patent: Mar. 29, 2005

(54) ADJUSTABLE SHOCK ABSORBER FOR A MOTOR VEHICLE

(75) Inventors: Alexander Stiller, Garbsen (DE); Jörg Kock, Burgwedel (DE); Christian Treder, Mandelsloh (DE); Stefan Zoufal, Dedensen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/352,911

(22) Filed: Jan. 29, 2003

(65) Prior Publication Data

US 2003/0141157 A1 Jul. 31, 2003

(30) Foreign Application Priority Data

Jan. 29, 2002 (DE) .......................................... 102 03 554

(51) Int. Cl.[7] .................................................. F16F 9/34
(52) U.S. Cl. ................................ 188/282.2; 188/299.1; 280/5.515
(58) Field of Search .......................... 188/282.2, 282.4, 188/280, 299.1; 280/5.515, 5.519, 5.5, 5.506, 5.507

(56) References Cited

U.S. PATENT DOCUMENTS

| | | | | |
|---|---|---|---|---|
| 5,088,760 A | * | 2/1992 | Kakizaki et al. | 280/5.515 |
| 5,293,969 A | * | 3/1994 | Yamaoka et al. | 188/266.5 |
| 5,701,245 A | * | 12/1997 | Ogawa et al. | 701/37 |
| 6,148,252 A | * | 11/2000 | Iwasaki et al. | 701/37 |
| 2002/0161498 A1 | * | 10/2002 | Stiller et al. | 701/37 |
| 2002/0166741 A1 | * | 11/2002 | Kock et al. | 188/266.1 |

FOREIGN PATENT DOCUMENTS

GB      2273473 A   *   6/1994

* cited by examiner

Primary Examiner—Pam Rodriguez
(74) Attorney, Agent, or Firm—Walter Ottesen

(57) ABSTRACT

An adjustable shock absorber (8) includes a damping force changing device (16) which continuously adjusts the damping force characteristic of the shock absorber in response to input control signals. A first signal is generated by a first sensor which represents the damping force movement. At least a second signal is generated by at least a second device (10a . . . ) which represents the vertical bodywork speed ($V_A$, 12) and/or the vehicle longitudinal speed (20). Based on this, a control signal (18) for adjusting the damping force characteristic is computed in accordance with a control law in the manner that the change of the desired current can be limited over time.

2 Claims, 4 Drawing Sheets

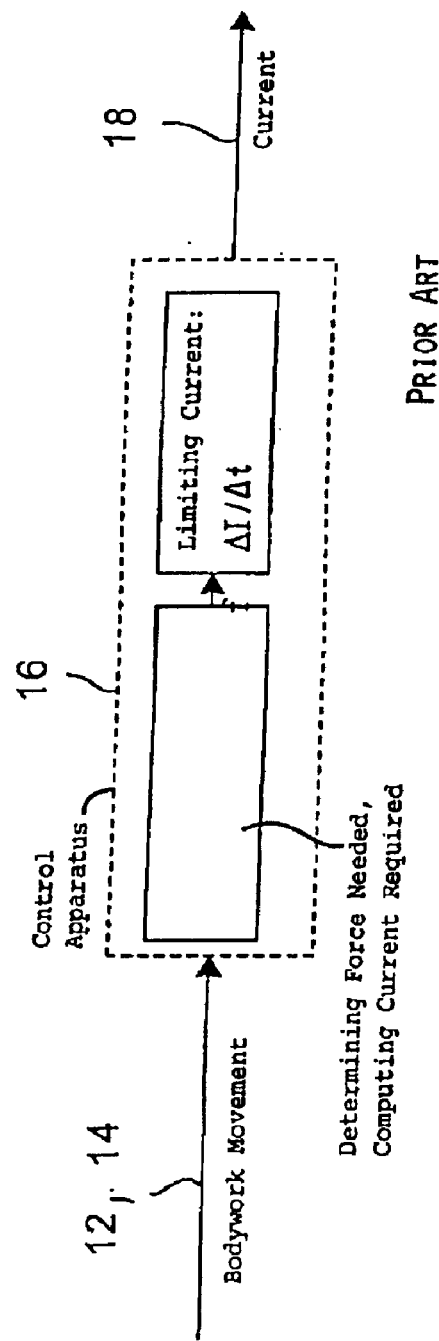
_Fig. 3_
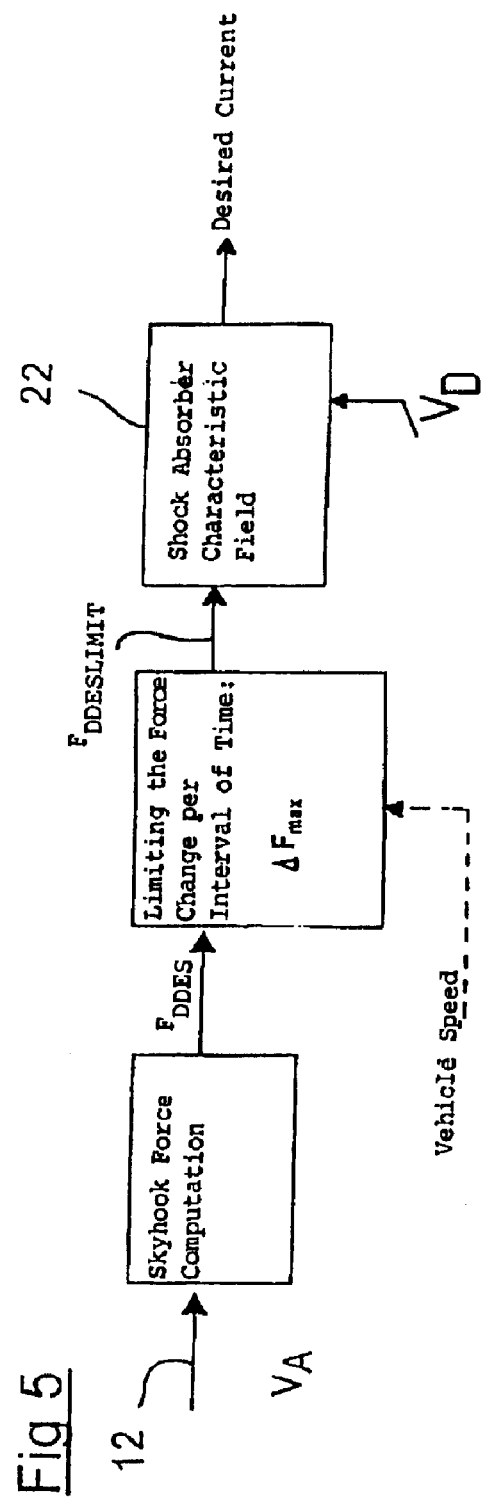
_Fig 5_

ADJUSTABLE SHOCK ABSORBER FOR A MOTOR VEHICLE

FIELD OF THE INVENTION

The invention relates to a method including a skyhook method for controlling the damping force of a vibration shock absorber in a vehicle suspension. The invention also relates to an adjustable vibration shock absorber.

BACKGROUND OF THE INVENTION

The control of semiactive shock absorbers with the aid of the skyhook method is known from the state of the art. In the skyhook method, a desired damping is computed which is proportional to the velocity of the bodywork of the vehicle. From the desired damping force and the determined shock absorber speed, the damping force is converted into a desired current with the aid of an inverse shock absorber characteristic field when the sign of the shock absorber speed and desired damping force are the same. In contrast, for different signs of the desired damping force and the shock absorber speed, a desired damping force is requested which corresponds to the smallest possible adjustable damping force. In the standard skyhook method, the transition from a high damping force to a low damping force and vice versa is abrupt. Noticeable unwanted noises develop because of high force gradients in the shock absorber movement and these noises are very unpleasant for the passengers of the vehicle and therefore considerably affect the driving comfort. Especially those shift operations cause hammer-like noises for which shifting takes place at a shock absorber speed unequal to zero (see FIG. 2).

German patent publication 4,240,614 shows that the shock absorber speed or the relative speed between bodywork of the vehicle and the particular wheel and the vehicle longitudinal speed are known. From this publication, it is more or less known that the shock absorber speed as well as the vehicle longitudinal speed can be applied as a criterion for influencing a change in the force of the shock absorber. For this purpose, the time-dependent change of the forces, which are developed between the vehicle bodywork and the wheel, are limited. Especially, it is intended that high-frequency peaks of the force change be suppressed. The hammer-like noises, which occur in accordance with the standard skyhook method, are, however, not eliminated by the method described in German patent publication 4,240, 614.

SUMMARY OF THE INVENTION

It is an object of the invention to modify the shock absorber controller so that the shock absorber switching noises, which occur in the standard skyhook method, can be variably reduced. Also, it is an object of the invention to suppress the noises caused by the adjustment of continuously adjustable shock absorbers.

There are three speeds relevant to the invention, namely, the shock absorber speed, the bodywork speed and the driving or roadway speed.

The shock absorber speed is the relative speed between the piston of the shock absorber and the cylinder thereof; stated otherwise, the relative speed is the speed between the bodywork of the vehicle and the wheel.

The bodywork speed or the speed of the suspended mass is the vertical speed between the vehicle body and an imaginary zero line in the planar surface of the roadway. The driving or roadway speed is the horizontal longitudinal speed of the vehicle.

The method of the invention is for controlling the damping force for a shock absorber of a vehicle wheel suspension arranged between a wheel of the vehicle and the vehicle body. The shock absorber has a damping force characteristic and the method includes the steps of: providing a damping force change unit which responds to first and second signals to continuously adjust the damping force characteristic; generating the first signal utilizing means which represents the speed of the shock absorber; generating the second signal utilizing means which represents the vertical bodywork speed of the suspended mass of the bodywork; computing a control signal based on the first and second signals in accordance with the skyhook method for adjusting the damping force characteristic; and, limiting at least one of the time-dependent change of the damping force and the time-dependent change of the shock absorber current when the shock absorber speed and the vertical bodywork speed have different signs.

A development of noise caused by switching operations on the shock absorber is prevented because of a limiting of the time-dependent change of the damping force and/or of the shock absorber current in accordance with the invention. This time-dependent change is the rate of change of speed.

Limiting the current change (and therefore indirectly the force change in the shock absorber), takes place continuously in accordance with the invention in dependence upon the longitudinal road speed of the vehicle. A two-dimensional characteristic field is defined which is applicable to the special vehicle conditions and in which the maximum permissible damping force change and/or current change is pregiven as a function of the longitudinal road speed.

In this way, for slow travel (wherein no high damping force requirement and therefore no high controller dynamic is required), the vehicle can be acoustically optimally tuned and, for high road speeds (where the acoustic requirements are more likely secondary because of the high secondary noises), a high controller dynamic can be obtained.

Acoustic advantages of the above-described solution result especially for shock absorber controls in accordance with the skyhook principle. The noises, which are generated with the abrupt switchover of the shock absorber characteristic (force jump), can be reduced especially at low road speeds.

A nonlinearity of the shock absorber current/shock-absorber force characteristic line cannot be considered when only influencing the change of current of the shock absorber.

BRIEF DESCRIPTION OF THE DRAWINGS

The invention will now be described with reference to the drawings wherein:

FIG. 3 is a schematic for limiting current in adjustable shock absorbers in accordance with the state of the art;

FIG. 5 shows a second embodiment for limiting current; and,

DESCRIPTION OF THE PREFERRED EMBODIMENTS OF THE INVENTION

Figure 1:
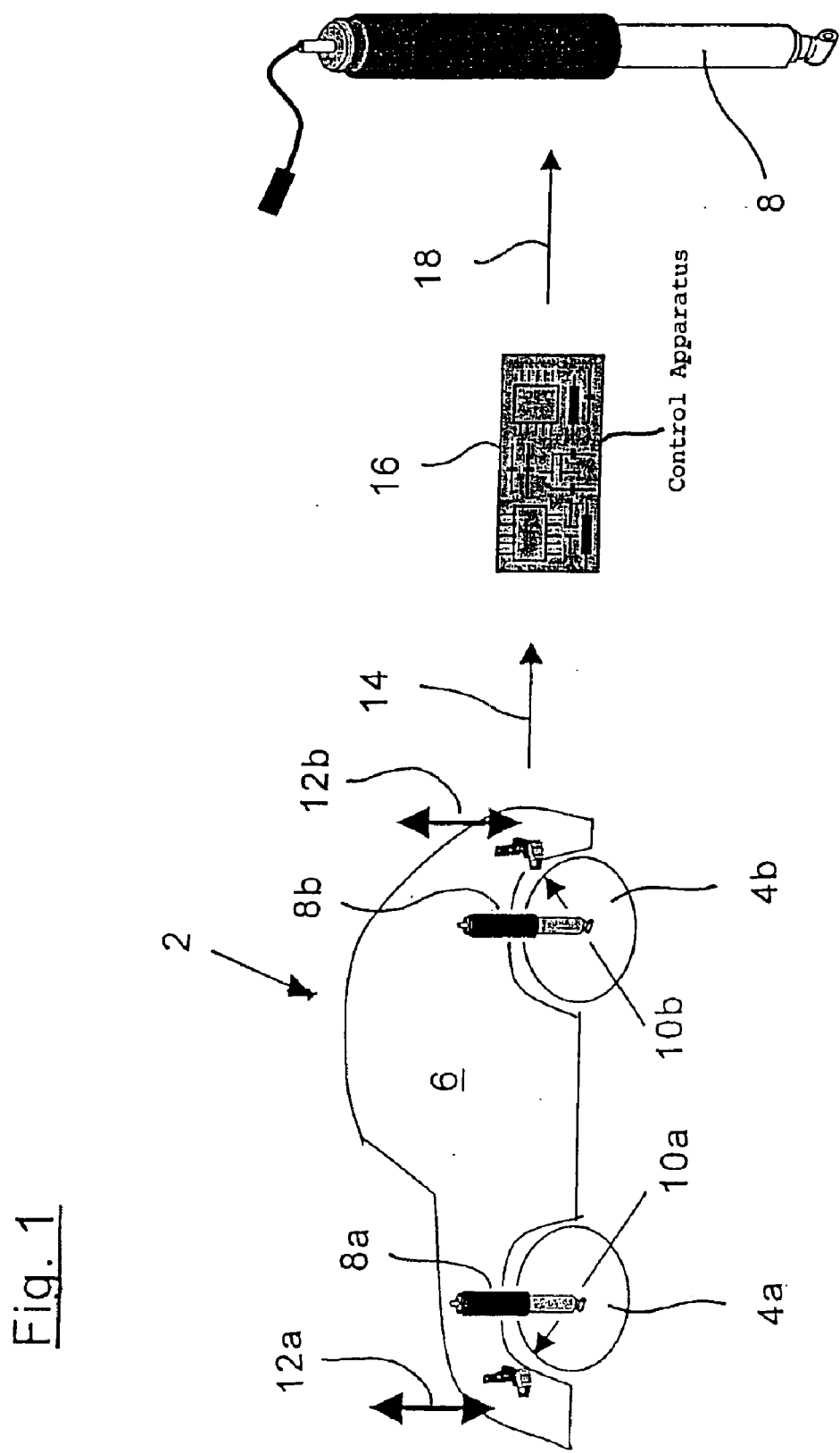
FIG. 1 is a schematic showing the adjustable shock absorber and control apparatus in the context of a motor vehicle.

FIG. 1 shows a motor vehicle 2 wherein shock absorbers are mounted between respective wheels or axles thereof and the body 6. Only two wheels are shown and are identified by reference numerals (4a, 4b). Three shock absorbers (8, 8a, 8b) are shown. The bodywork is provided with sensors (10, 10a, 10b) for determining the bodywork speed ($V_A$, 12a, 12b). The bodywork speed is the vertical speed between the bodywork of the vehicle and an imaginary zero line in the planar surface of the roadway.

The relative movement of the wheel to the bodywork is likewise monitored by the sensors for the purpose of determining the shock absorber speed. As noted above, the shock absorber speed is the relative speed between the shock absorber piston and the shock absorber cylinder. The signals 14 are generated by the sensors (10a, 10b) and are supplied to an electronic control apparatus 16 where they are processed to form control signal 18 and supplied to the electrically adjustable shock absorbers (8, 8a, 8b).

Figure 2:
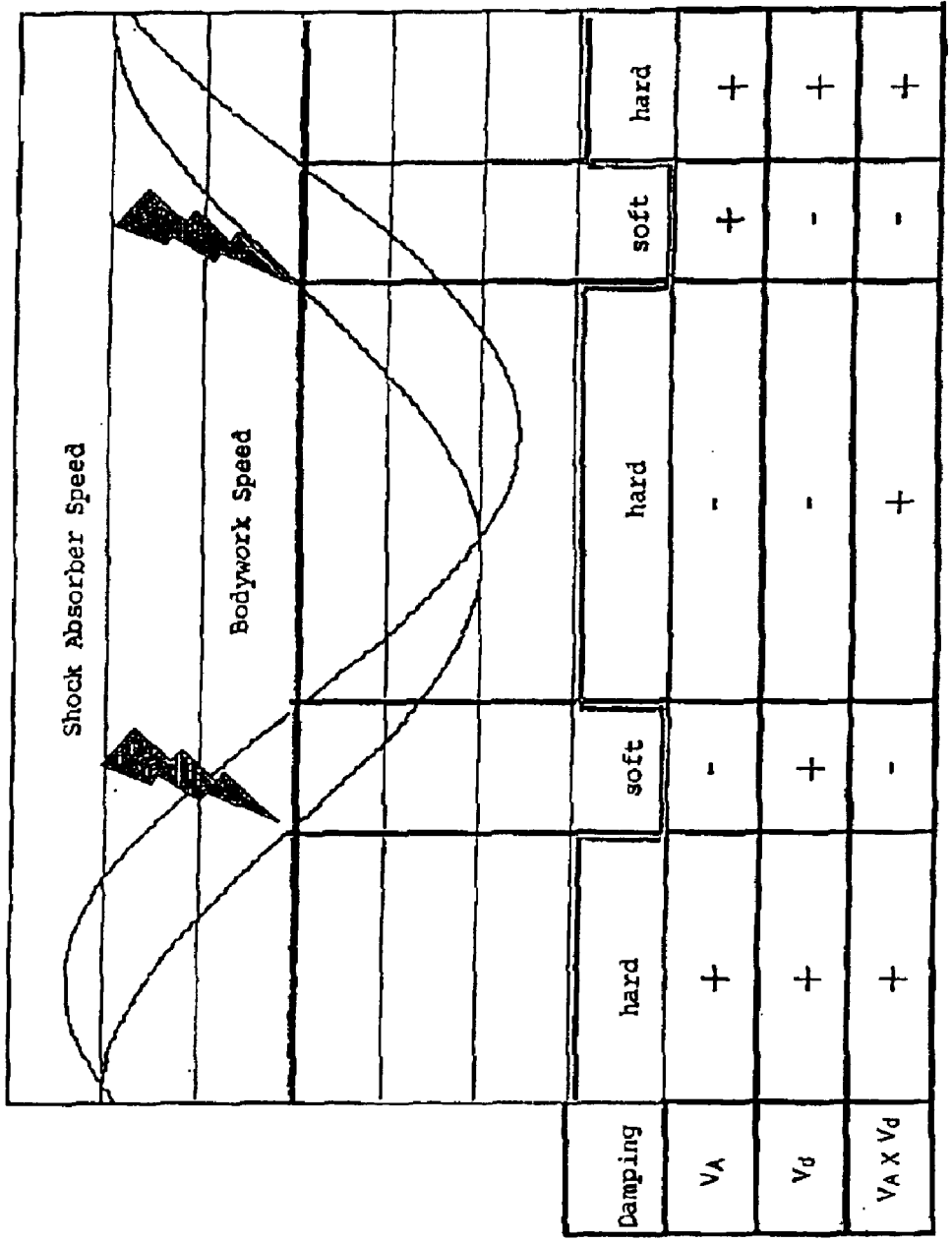
FIG. 2 is a schematic showing the conventional skyhook control.

A measure, which is to be carried out in the control apparatus 16, takes place either by limiting the current I (state of the art) or by limiting the change of the current per unit of time dI/dt as shown in FIG. 3 (in this way, jump-like changes of the damping force, which is adjusted via the current, and a development of unwanted noise caused thereby are suppressed) or, according to the standard skyhook method, by a switchover of the damping from "hard" to "soft" when shock absorber speed and bodywork speed differ from each other with respect to sign (FIG. 2).

Figure 4:
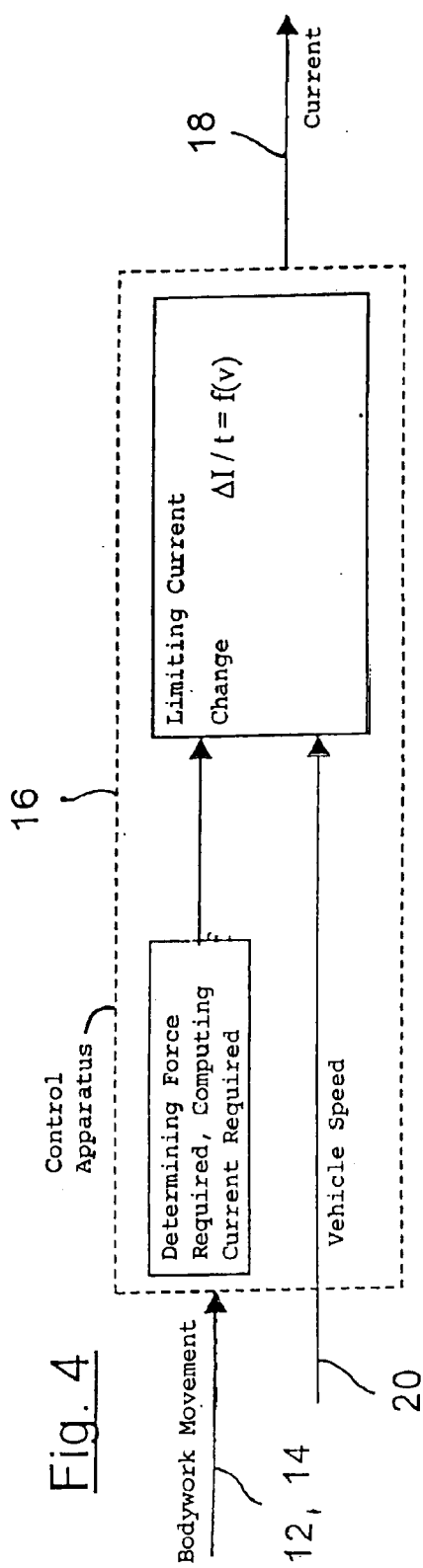
FIG. 4 shows a first embodiment for limiting current.
Figure 6:
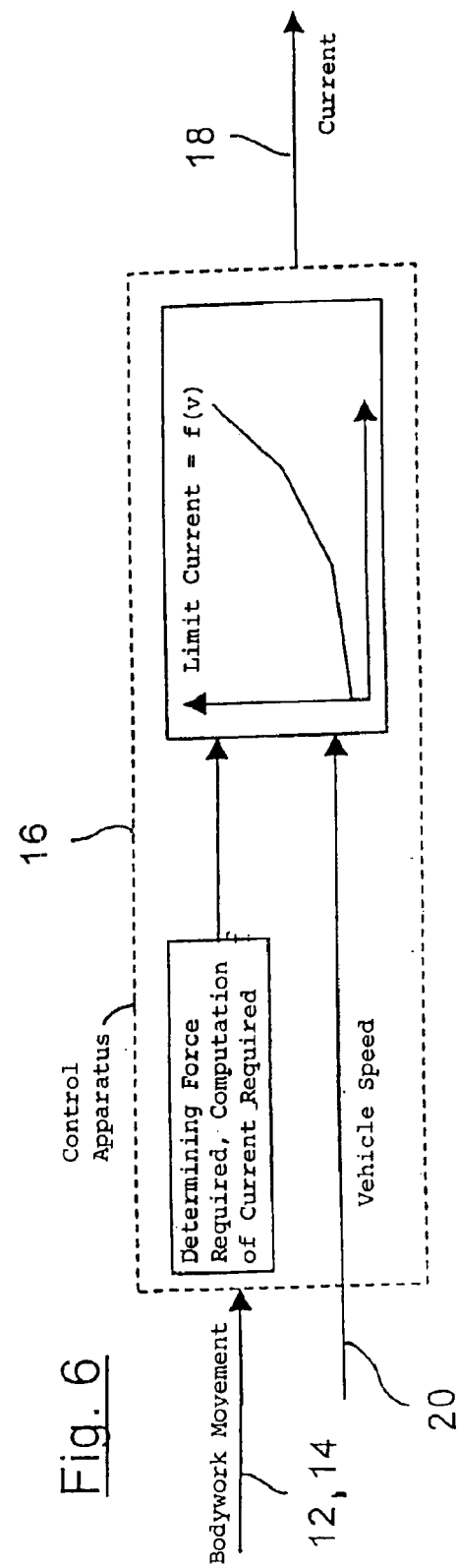
FIG. 6 shows a third embodiment for limiting current.

FIGS. 4, 5 and 6 show three different alternatives of further improvements in accordance with the invention.

In FIG. 4, a limiting of the current change per time interval of the shock absorber 8 takes place while considering the vehicle longitudinal speed 20. A consideration of the vehicle longitudinal speed 20 can, for example, be undertaken in that, at low vehicle speeds, only a slight change of the current per unit of time is permitted in that a low limit for the current change for low speeds is pregiven and that, at higher vehicle speeds, a higher change of current per unit of time is permitted in that a higher limit is inputted for the current change for these higher speeds. This control is based on the idea that, at low vehicle speeds, a large current change and therefore a large change of the damping force is not needed and that, at low vehicle speeds, disturbing noises are especially to be avoided because the driver would perceive them to a greater extent.

FIG. 5 shows a further development of the standard skyhook method. A limiting of the force change per unit of time takes place when shock absorber speed and bodywork speed ($V_A$, 12a, . . . ) differ from each other with respect to sign.

More specifically, the method of the invention limits the magnitude of the possible force change over time, which is applied by means of a damping force actuating element 22 to the shock absorber 8 with:

$$F_{DDESLIMIT}(t) = F_{DDESLIMIT}(t-1) + \Delta F(t)$$

wherein:

$\Delta F(t) = F_{DDESLIMIT}(t-1)$, if $F_{DDES}(t) - F_{DDESLIMIT}(t-1) < \Delta F_{max}$ $\Delta F(t) = \Delta F_{max}$, if $F_{DDES}(t) - F_{DDESLIMIT}(t-1) > \Delta F_{max}$ $\Delta F(t) = -\Delta F_{max}$, if $F_{DDES}(t) - F_{DDESLIMIT}(t-1) < -\Delta F_{max}$ and t is the scanning time of the shock absorber controller.

The control apparatus 16 (see FIG. 1) outputs an $F_{DDESLIMIT}(t)$ which differs from a previously pregiven $F_{DDESLIMIT}(t-1)$ maximally by $\Delta F_{max}$. In this way, large jumps in the input of the desired damping force $F_{DDES}(t)$ are avoided. The $F_{DDESLIMIT}(t)$ is computed by the control apparatus and is. while considering the instantaneous shock absorber speed, converted into a shock absorber desired current with the aid of a shook absorber characteristic field wherein the desired current is stored in dependence upon the damping force and the shock absorber speed. The determined shock absorber desired current is adjusted at the shock absorber. Limiting the change of the desired damping force affords the advantage that the magnitude of the damping force change is thereby pregiven directly.

The $\Delta F_{max}$, which is shown in FIG. 5, can be pregiven in dependence upon the vehicle speed just as that of the limiting of the current change per time. Here too, the vehicle speed can be considered so that, at low vehicle speeds, only a low $\Delta F_{max}$ is permitted and, at higher vehicle speeds, a higher $\Delta F_{max}$ is permitted. This control is based on the same idea as it is explained above in connection with the current change.

In FIG. 6, a limiting of the current for application to the shock absorber 8 takes place while considering the vehicle speed 20.

If the shock absorber, for example, has a valve, which adjusts a high damping at a high current and a low damping at a low current, then a limiting of the current to a value, which may not be exceeded (upper limit), means that the maximum of the adjustable damping force is limited or reduced (when the upper limit is reduced). On the other hand, limiting the current to a value, which may not be exceeded (lower limit), means that the minimum of the adjustable damping force is limited or raised (when the lower limit is raised). By limiting the current in both directions, a maximum hardness and softness of the shock absorber is pregiven. At low vehicle speeds, the shock absorber is preferably adjusted to soft (that is, the upper limit is greatly reduced) and, at high vehicle speeds, is preferably adjusted to hard (that is, the lower limit is raised very substantially).

The damping force control can take place also pneumatically or mechanically in the embodiments shown.

It is understood that the foregoing description is that of the preferred embodiments of the invention and that various changes and modifications may be made thereto without departing from the spirit and scope of the invention as defined in the appended claims.

What is claimed is:

1. A method for controlling the damping force for a shock absorber of a vehicle wheel suspension arranged between a wheel of a vehicle and the body of the vehicle, the shock absorber having a damping force characteristic, the method comprising the steps of:

providing a damping force change unit which responds to first and second signals to continuously adjust said damping force characteristic;

generating said first signal utilizing means which represents the speed of said shock absorber;

generating said second signal utilizing means which represents a vertical bodywork speed of a suspended mass of said bodywork of the vehicle;

computing a control signal based on said first and second signals in accordance with the skyhook method for adjusting said damping force characteristic;

limiting at least one of a time-dependent change or rate of change of speed of the damping force and a time-dependent change or rate of change of speed of the shock absorber current when said shock absorber speed and said vertical bodywork speed have different signs;

wherein said shock absorber is an electrically adjustable shock absorber; and, wherein the damping force is adjustable via the magnitude of a current, the method comprising the further step of:

determining a desired current for a current adjusting member from a measured and stored characteristic field of the shock absorber in that said desired current is determined by interpolation from a desired damping force input and a determined shock absorber speed from said characteristic field.

2. A shock absorber arrangement for a motor vehicle, the shock absorber arrangement comprising:

a shock absorber having a damping force characteristic;

a damping force changing unit;

first means for generating a first signal representing the speed of the shock absorber;

second means for generating a second signal representing the vertical bodywork speed of a suspended mass of the bodywork of the motor vehicle;

said damping force changing unit including an electric control apparatus having a limiter for generating an electrical signal having a shock absorber current change which can be limited;

said shock absorber having a current adjusting member for controlling the desired damping force with the aid of a control signal;

said control signal being computable in accordance with the skybook method based on said first and second signals; and, means for limiting a time-dependent change of the damping force and/or the current of said shock absorber when said shock absorber speed and said vertical bodywork speed have different signs;

wherein said damping force changing unit includes a stored characteristic field from which a needed desired current can be determined from a desired damping force input and a determined shock absorber speed.

* * * * *